United States Patent [19]
Hellyer, Jr.

[11] 3,821,413
[45] June 28, 1974

[54] ATMOSPHERIC GLYCAL GERMICIDES

[76] Inventor: Henry L. Hellyer, Jr., 99 Haques Mill Rd., Ambler, Pa. 19002

[22] Filed: Apr. 12, 1972

[21] Appl. No.: 243,244

[52] U.S. Cl. .................................. 424/343, 424/76
[51] Int. Cl. ............................................. A01n 9/24
[58] Field of Search .............. 424/76, 343; 252/522

[56] References Cited
UNITED STATES PATENTS
3,160,555  12/1964  Hamill et al. ........................ 424/76
3,268,594  8/1966  Bedoukian ........................ 252/522

OTHER PUBLICATIONS
Sagarim; Cosmetics Science & Technology (1957) pp. 776–778.
Appell, Amer. Perfumer Cosmetics, Vol. 79, No. 11, pp. 25–39 (1964).

Primary Examiner—Albert T. Meyers
Assistant Examiner—Allen J. Robinson
Attorney, Agent, or Firm—John J. Mackiewicz

[57] ABSTRACT

An aerial disinfectant composition comprising a homogeneous, single phase liquid mixture of (a) from about 5 percent to about 85 percent by weight of a glycol germicide; (b) from about 2 percent to about 40 percent by weight of an organic polar coupling compound for maintaining the homgeneity of said mixture to prevent the glycol from separating from the mixture during evaporation of the mixture into the atmosphere; and (c) from about 5 percent to about 80 percent by weight of an organic, relatively non-polar compound for forming hydrophobic micelles surrounding the glycol molecules in said mixture for reducing the affinity of said glycol to atmospheric moisture and thereby increasing the rate of evaporation of said glycol. The composition is especially adapted for volatilization at a substantially uniform rate from an air circulator device into the surrounding atmosphere continuously to reduce the air-borne bacteria in such atmosphere. According to a preferred embodiment, the glycol component (a) is propylene glycol or a mixture of propylene glycol and triethylene glycol; component (b) comprises from 2 percent to 40 percent of a mixture of beta-phenylethyl alcohol and alpha-terpineol; and component (c) comprises from 5 percent to 80 percent of a mixture of linalyl acetate, isoamyl salicylate and benzyl acetate.

4 Claims, 1 Drawing Figure

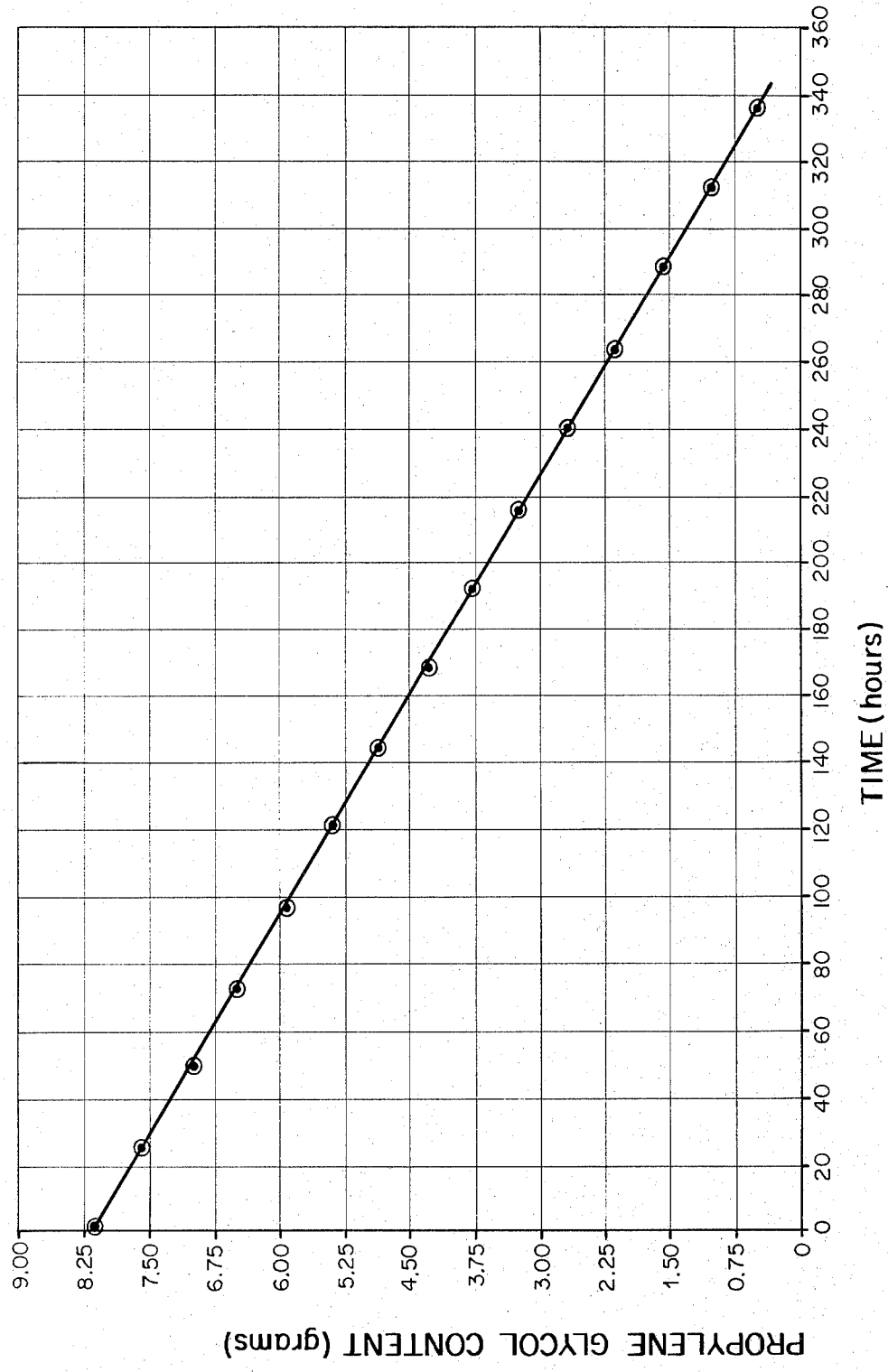

ATMOSPHERIC GLYCAL GERMICIDES

BACKGROUND OF THE INVENTION

1. Field of the Invention

This invention relates to atmospheric germicides and, more particularly, is concerned with an aerial disinfectant composition characterized by a substantially uniform rate of evaporation into the atmosphere from an air circulator device so as continuously to reduce the air-borne bacteria in the surrounding atmosphere.

2. Description of the Prior Art

The germicidal effect of glycol vapors on air suspended microorganisms is clearly established and has been reported in the literature. Bigg, Jennings, and Olson, Eipedemiologic Observations on the Use of Glycol Vapors for Air Sterilization, American Journal of Public Health, Vol. 35, No. 8 (1945); Polderman, Triethylene Glycol for Air Sanitation, Soap and Sanitary Chemicals, July 1947, and November, December 1949; Frobisher, Fundamentals of Microbiology, seventh Ed., Chapter 40 (1962).

Germicidal concentrations of glycol vapor are known to be odorless, tasteless, non-irritating, non-toxic, invisible, and have no deleterious effect on walls, fabrics, books or other objects in the treated space. Robertson, Disinfection of the Air with Triethylene Glycol Vapor, The American Journal of Medicine, Vol. VII No. 3, pages 293-296 (1949).

The maintenance of an adequate concentration of glycol vapor in the atmosphere has offered the principal problem in the practical use of glycols as germicides. In order to attain the desired air-sanitizing performancy, various means have been utilized for forced evaporation of glycols into the atmosphere, involving, for example, propellant-based aerosols, heat, mechanical sprayers, and the like. However, because of the poor volatility of glycols, it has not previously been possible to effect any significant and continuous reduction of air-borne bacteria over a prolonged period, i.e. for more than two hours and at least one week, by the use of an air circulator wherein air is passed over a wick immersed in a glycol-containing liquid. See, for example, U.S. Pat. No. 2,921,832 — Holther.

SUMMARY OF THE INVENTION

It is therefore a principal object of the present invention to provide a unique formulation of materials which permits an effective, uniform rate of evaporation of glycols from an air circulator device to reduce effectively and continuously the airborne bacteria in the surrounding atmosphere. It has been discovered that this objective can be achieved provided certain criticalities are observed. More particularly, it has been found that the relative amounts and identities of the components of the invention are critical to the attainment of the desired continuous evaporation of glycols over a prolonged period of time.

The compositions of the present invention are single phase liquid compositions which are especially adapted for volatilization at a substantially uniform rate from an air circulator device into the surrounding atmosphere continuously to reduce the air-borne bacteria in such atmosphere over a prolonged period of time. Generally speaking, the compositions of the invention include three essential components: (1) a glycol or a mixture of two or more glycols; (2) an organic polar coupling compound for maintaining the homogeneity of the final composition to prevent the glycol from separating from the mixture during evaporation of the mixture into the atmosphere; and (3) an organic, relatively non-polar compound for forming hydrophobic micelles with the glycol molecules in the resulting mixture for reducing the affinity of the glycol to atmospheric moisture and thereby, increasing the rate at which the glycol may be evaporated into the atmosphere.

The compositions of the invention contain from about 5 percent by weight to about 85 percent by weight of a glycol germicide. Suitable glycols include propylene glycol, dipropylene glycol, ethylene glycol, triethylene glycol, diethylene glycol, tetraethylene glycol, hexylene glycol, 2-ethyl-1,3-hexanediol and 1,5-pentanediol. Other suitable glycols which may be used will readily occur to those skilled in the art. If desired, other suitable germicides or antiseptic agents can be added provided, however, that the glycol concentration of the composition does not fall below 5 percent by weight of the total mixture. Such germicides include quaternary ammonium compounds, phenols, bisphenols, salicylanilides, carbanilides, formaldehyde and chlorine.

The required glycol evaporation rate for attaining the desired air sanitizing performance depends on the satisfactory stability and uniform nature of the liquid composition during evaporation from the mixture. Accordingly, the compositions of the invention include from about 2 percent to about 40 percent by weight of an organic polar coupling compound for maintaining the homogeneity of the mixture to prevent the glycol from separating from the mixture during the evaporation process. Suitable organic polar coupling compounds which may be used for this purpose include alpha-terpineol, benzyl alcohol, beta-phenylethyl alcohol, linalool, lavandulol, isoamyl vinyl carbinol, alpha-hexyl vinyl carbinol, nopyl alcohol, citronellol, cedrenol and anisyl alcohol.

The affinity of glycols to attract atmospheric moisture significantly reduces their volatility and impairs their evaporation rate. Accordingly, the compositions of the invention include from about 5 percent to about 80 percent by weight of an organic, relatively non-polar compound for forming hydrophobic micelles surrounding the glycol molecules in the mixture for reducing the affinity of the glycol to atmospheric moisture and thereby increase the rate of evaporation of the glycol. Without this micelle formation, it has been found that the glycol or mixture of glycols in the mixture cannot evaporate appreciably in an air circulator device containing a wick immersed in the liquid composition. Examples of relatively non-polar compounds which can be used in this respect include linalyl acetate, benzyl acetate, isoamyl salicylate, acetophenone, terpinyl acetate, citronellyl acetate, benzyl propionate, octyl acetate, decyl acetate, geranyl acetate, 1,3-nonanediol acetate, allyl caproate and para-cresyl methyl ether.

It has also been discovered that isoamyl salicylate, in addition to its role in the formation of hydrophobic micelles can, by virtue of its hydrogen-bonding performance, also function as a coupler for assisting the maintenance of homogeneity and stability of the liquid formulation during its evaporation. In this connection, it has been found that all or a portion of the isoamyl salicylate can be substituted by eugenol, isoeugenol, hydroxycitronellal, cyclamal, isobutylsalicylate, methyl ionone, tert-butyl cyclohexyl acetate or ethylene brassylate.

The compositions of the invention may additionally include, if desired, minor amounts of any of the well-known deodorants such, for example, as oil of cloves, oil of lavender, oil of cassia, peppermint oil, oil of bergamot and pine oil. Other suitable deodorants will readily occur to those skilled in the art. Generally speaking, the amount of deodorant added may vary up to about 2 percent of the total mixture. Preferably, the deodorant is present in amounts of less than 1 percent of the total weight of the mixture.

In accordance with a preferred form of the invention, the glycol, or mixture of two or more glycols, is present in amounts ranging from about 10 to about 50 percent of the weight of the total mixture; the polar coupling compound is present in amounts ranging from about 7 percent to about 30 percent by weight of the total mixture in the form of a blend including alpha-terpineol and beta-phenylethyl alcohol, with the alpha-terpineol ranging from about 5 percent to about 20 percent by weight of the total mixture and the beta-phenylethyl alcohol ranging from about 2 percent to about 10 percent by weight of the total mixture; and from about 25 percent to about 70 percent by weight of the relatively non-polar hydrophobic micelle-producing compound in the form of a mixture including from about 10 percent to about 30 percent of linalyl acetate, from 5 percent to about 20 percent of isoamyl salicylate and from about 10 percent to about 25 percent by weight of benzyl acetate, said weights being based on the total weight of the homogeneous, single phase liquid composition of the invention.

The following examples of specific formulations falling within the scope of the present invention are presented for the purposes of illustration and not limitation. All percentages are by weight.

Formulation 1
 Propylene Glycol — 13.7 percent
 Alpha-Terpineol — 12.1 percent
 Beta-Phenylethyl Alcohol — 6.1 percent
 Linalyl Acetate — 28.0 percent
 Isoamyl Salicylate — 16.1 percent
 Benzyl Acetate — 24.0 percent Formulation 2
 Propylene Glycol — 30.0 percent
 Alpha-Terpineol — 14.0 percent
 Beta-Phenylethyl Alcohol — 6.0 percent
 Linalyl Acetate — 20.0 percent
 Benzyl Acetate — 19.0 percent
 Isoamyl Salicylate — 11.0 percent Formulation 3
 Propylene Glycol — 40.0 percent
 Alpha-Terpineol — 6.0 percent
 Beta-Phenylethyl Alcohol — 3.0 percent
 Linalyl Acetate — 20.0 percent
 Benzyl Acetate — 20.0 percent
 Isoamyl Salicylate — 10.0 percent
 Benzyl Propionate — 0.5 percent
 Oil of Bergamot — 0.5 percent Formulation 4
 Propylene Glycol — 45.0 percent
 Alpha-Terpineol — 5.0 percent
 Beta-Phenylethyl Alcohol — 2.0 percent
 Linalyl Acetate — 17.0 percent
 Isoamyl Salicylate — 12.0 percent
 Benzyl Acetate — 18.0 percent
 1,3-Nonanediol Acetate — 0.5 percent
 Oil of Cloves — 0.5 percent Formulation 5
 Propylene Glycol — 47.0 percent
 Alpha-Terpineol — 7.3 percent
 Beta-Phenylethyl Alcohol — 3.7 percent
 Linalyl Acetate — 16.7 percent
 Isoamyl Salicylate — 9.9 percent
 Benzyl Acetate — 15.4 percent Formulation 6
 Dipropylene Glycol — 40.0 percent
 Alpha-Terpineol — 7.0 percent
 Beta-Phenylethyl Alcohol — 3.5 percent
 Linalyl Acetate — 20.0 percent
 Benzyl Acetate — 20.0 percent
 Isoamyl Salicylate — 9.0 percent
 Oil of Lavender — 0.5 percent Formulation 7
 Triethylene Glycol — 10.0 percent
 Alpha-Terpineol — 18.0 percent
 Beta-Phenylethyl Alcohol — 10.0 percent
 Benzyl Acetate — 23.0 percent
 Isoamyl Salicylate — 17.0 percent
 Linalyl Acetate — 22.0 percent Formulation 8
 Propylene Glycol — 46.9 percent
 Triethylene Glycol — 5.0 percent
 Hexylene Glycol — 5.0 percent
 Linalool — 5.0 percent
 Alpha-Terpineol — 7.3 percent
 Beta-Phenylethyl Alcohol — 3.7 percent
 Linalyl Acetate — 11.7 percent
 Isoamyl Salicylate — 5.0 percent
 Benzyl Acetate — 10.4 percent Formulation 9
 Propylene Glycol — 40.0 percent
 Hexylene Glycol — 20.0 percent
 Triethylene Glycol — 5.0 percent
 Linalool — 10.0 percent
 Isoamyl Salicylate — 5.0 percent
 Linalyl Acetate — 10.0 percent
 Benzyl Acetate — 10.0 percent All of the above formulations comprise liquid single phase mixtures, which were easily and conveniently prepared by blending the components together to provide mixtures characterized by a substantially uniform rate of evaporation into the surrounding atmosphere. The individual components used to provide the compositions of the invention are well known, commercially available materials which have been used in perfumery. Vapor pressures and boiling points of most of these components are reported by Aptell in American Perfumer and Cosmetics, Vol. 79, No. 11, pages 25–39 (1964).

Table I below describes the loss in weight of propylene glycol from one of the compositions of the invention (Formulation 1 above) starting with 60 grams contained in two 1 ounce bottles. The latter were placed in a Keythol air circulator, Model No. 1,700 (sold commercially by the Keystone Scent Conditioner Company of Philadelphia, Pa.) which was run continuously for 14 days. The evaporation loss of the propylene glycol to the air from the two 1 ounce bottles was determined daily by vapor phase chromatographic analysis of the formulation remaining in the bottles. The room dimensions were 17 feet × 15 feet × 10 feet (2,550 cubic feet). The relative humidity throughout the test was 35 percent ± 15 percent and the temperature varied from 69° to 74°F. The test was carried out twice.

TABLE I

| Time (hours) | Propylene Glycol Content In Two 1 oz. Bottles Containing 60 Grams of Formulation 1. (Grams) | |
|---|---|---|
| | Test 1 | Test 2 |
| 0 | 8.22 | 8.22 |
| 24 | 7.64 | 7.62 |
| 48 | 7.04 | 7.03 |
| 72 | 6.49 | 6.46 |
| 96 | 5.95 | 5.93 |
| 120 | 5.41 | 5.40 |
| 144 | 4.86 | 4.85 |
| 168 | 4.32 | 4.30 |
| 192 | 3.78 | 3.75 |
| 216 | 3.25 | 3.25 |
| 240 | 2.70 | 2.71 |
| 264 | 2.15 | 2.16 |
| 288 | 1.59 | 1.59 |
| 312 | 1.03 | 1.02 |
| 336 | 0.50 | 0.52 |

The accompanying drawing graphically illustrates the data set forth in Table I, which show the substantially uniform rate of evaporation of the composition of the invention. The average rate of evaporation of the propylene glycol during fourteen days was about 0.55 gram per day.

It should be understood that while the present invention has been described in considerable detail with respect to certain specific embodiments thereof, it is not to be considered limited to those embodiments but may be used in other ways without departure from the spirit of the invention or the scope of the appended claims.

What is claimed is:

1. An aerial glycol disinfectant composition comprising a homogeneous, single phase liquid mixture of:
   a. from about 5 percent to about 85 percent by weight of a glycol selected from the group consisting of propylene glycol, dipropylene glycol, ethylene glycol, triethylene glycol, diethylene glycol, tetraethylene glycol, hexylene glycol, 2-ethyl-1,3-hexanediol and 1,5 pentanediol,
   b. from about 2 percent to about 40 percent by weight of a compound selected from the group consisting of alpha terpineol, benzyl alcohol, beta-phenylethyl alcohol, linalool, levandulol, isoamyl vinyl carbinol, alpha-hexyl vinyl carbinol, nopyl alcohol, anisyl alcohol, citronellol, and cedrenol, and
   c. from about 5 percent to about 80 percent by weight of a compound selected from the group consisting of linalyl acetate, benzyl acetate, isoamyl salicylate, acetophenone, terpineol acetate, citronellyl acetate, benzyl propionate, octyl acetate, decyl acetate, geranyl acetate, 1,3-nonanediol acetate, allyl caproate, para-cresyl methyl ether, eugenol, isoeugenol, hydroxycitronellal, cyclamal, isobutyl salicylate, ethylene brassylate, methyl ionone, and tert-butyl cyclohexyl acetate.

2. The composition of claim 1 in which component (b) is present in amount ranging from about 7 percent to about 30 percent of the total mixture and includes alpha-terpineol and beta-phenylethyl alcohol in amounts such that the alpha-terpineol ranges from about 5 percent to about 20 percent of the total mixture and the beta-phenylethyl alcohol ranges from about 2 percent to about 10 percent by weight of the total mixture; and component (c) ranges from about 25 percent to about 70 percent of the total mixture and includes linalyl acetate, isoamyl salicylate, and benzyl acetate in amounts such that the linalyl acetate ranges from about 10 percent to about 30 percent by weight of the mixture, the isoamyl salicylate ranges from about 5 percent to about 20 percent of the mixture, and the benzyl acetate ranges in amounts from about 10 percent to about 25 percent of the mixture.

3. The composition of claim 1 wherein component (a) comprises 47 percent propylene glycol; component (b) comprises a mixture of alpha-terpineol and beta-phenylethyl alcohol in amounts such that the alpha-terpineol comprises 7.3 percent by weight of the total mixture and the beta-phenylethyl alcohol comprises 3.7 percent by weight of the total mixture; and component (c) comprises a mixture of linalyl acetate, isoamyl salicylate and benzyl acetate in amounts of 16.7 percent, 9.9 percent and 15.4 percent, respectively, based upon the total weight of the mixture.

4. The composition of claim 1 wherein, based on the total weight of the mixture, component (a) contains 46.9 percent propylene glycol, 5 percent triethylene glycol and 5 percent hexylene glycol; component (b) comprises a mixture of 5 percent linalool, 7.3 percent alpha-terpineol and 3.7 percent beta-phenylethyl alcohol; and component (c) comprises a mixture of linalyl acetate, isoamyl salicylate and benzyl acetate in amounts of 11.7 percent, 5.0 percent and 10.4 percent, respectively.

* * * * *

O-1050
(5/69)

UNITED STATES PATENT OFFICE
CERTIFICATE OF CORRECTION

Patent No. 3,821,413  Dated June 28, 1974

Inventor(s) Henry L. Hellyer, Jr.

It is certified that error appears in the above-identified patent and that said Letters Patent are hereby corrected as shown below:

In the title - "GLYCAL" should be GLYCOL

Inventor's address "Haques" should be Hagues

Signed and sealed this 11th day of February 1975.

(SEAL)
Attest:

RUTH C. MASON
Attesting Officer

C. MARSHALL DANN
Commissioner of Patents
and Trademarks